United States Patent [19]

Dausinger et al.

[11] Patent Number: 4,488,882
[45] Date of Patent: Dec. 18, 1984

[54] METHOD OF EMBEDDING HARD CUTTING PARTICLES IN A SURFACE OF A CUTTING EDGE OF CUTTING TOOLS, PARTICULARLY SAW BLADES, DRILLS AND THE LIKE

[76] Inventors: Friedrich Dausinger, Steinenhausenstr. 18, D7000 Stuttgart; Werner Müller, Hermann-Essig-Str. 106, D-7141 Schwieberdingen; Eckart von Roda, Riegeläckerstr. 1, D-7250 Leonberg; Wilbert Reibetanz, Keltenstr. 5, D-7022 Leinfelden; Otto Baumann, Weingartenstr. 24, D-7022 Leinfelden, all of Fed. Rep. of Germany

[21] Appl. No.: 487,809

[22] Filed: Apr. 22, 1983

[30] Foreign Application Priority Data

May 3, 1982 [DE] Fed. Rep. of Germany ....... 3216456

[51] Int. Cl.³ .............................................. B24B 1/00
[52] U.S. Cl. .......................................... 51/295; 51/309; 264/22; 264/101; 427/53.1
[58] Field of Search ................... 51/295, 309; 264/22, 264/36, 101; 427/38, 53.1, 190

[56] References Cited

U.S. PATENT DOCUMENTS

| | | | |
|---|---|---|---|
| 3,751,283 | 8/1973 | Dawson | 51/295 |
| 3,787,273 | 1/1974 | Okrepkie et al. | 51/295 |
| 3,806,956 | 4/1974 | Supkis et al. | 51/295 |
| 3,942,959 | 3/1976 | Markoo et al. | 51/295 |
| 4,122,240 | 10/1978 | Banas et al. | 427/53.1 |
| 4,269,868 | 5/1981 | Livsey | 427/53.1 |
| 4,299,860 | 11/1981 | Schaefer et al. | 427/53.1 |
| 4,300,474 | 11/1981 | Livsey | 427/53.1 |
| 4,328,646 | 5/1982 | Kaganowicz | 427/38 |
| 4,401,719 | 8/1983 | Kobayashi et al. | 427/38 |

*Primary Examiner*—Theodore Morris
*Assistant Examiner*—Willie Thompson

[57] ABSTRACT

To apply hard cutting particles, for example of tungsten carbide, on the surface of the cutting edge of a cutting tool, such as a saw blade, a drill, or the like, the cutting edge is partially melted by an energy beam, for example a laser beam, or an electron beam. A laser beam is preferred since, then, the process can be carried out in air, or in a protective gas atmosphere, rather than in a vacuum. The beam partially melts the cutting edge and the granules of the hard metal particles, preferably in a random grain size of between 0.3 to 1.5 mm is permitted to run down, over the partially melted surface, excess being collected for reuse; alternatively, the partially melted surface can be dipped into the granules, and permitted to solidify.

20 Claims, No Drawings

METHOD OF EMBEDDING HARD CUTTING PARTICLES IN A SURFACE OF A CUTTING EDGE OF CUTTING TOOLS, PARTICULARLY SAW BLADES, DRILLS AND THE LIKE

The present invention relates to a method to apply cutting particles of hard material, such as tungsten carbide or the like, to the edge portion of a cutting surface of a cutting tool, such as a saw blade, a drill or the like.

BACKGROUND

It has previously been proposed to provide a coating of a hard, wear-resistent cover on metal tool bases, by melting-on or sintering-on a mixture of a metallic carbide, a metal alloy forming a binder, and a flux on the tool body, using an organic adhesive. The metallic surface to be coated with the carbide is first wetted with a shellac solution in alcohol, and is then covered with an intimate mixture of tunsten carbide and the pulverized mixture of a metal alloy. Thereafter, the powder coating is thermally sintered on the metallic surface.

The process as described requires auxiliary element, such as binders and adhesives besides the actual abrasive, or cutting particles of the tungsten carbide. The use of these auxiliary elements, binders, adhesives and the like substantially complicate the process, particularly when used under mass production conditions.

THE INVENTION

It is an object to provide a method of applying an abrasive, or cutting particles to substrate bodies, particularly to the cutting edges of cutting tools, such as saw blades, bores, drills or the like, which is simple and does not require the use of binders or adhesives.

Briefly, the surface, or edge of the base body or tool which is to be coated with the abrasive or cutting particles is partially melted by a radiant energy beam, for example a laser beam or an electon beam: the hard metal particles are then applied to the melted surface portions in granular form.

The melted surface can be upwardly directed and the granules permitted to flow on the melted surface in the form of a powder; or, otherwise, the melted surface can be dipped into a powder, or container of granular cutting particles of hard material.

The process has the advantage that no auxiliary material such as binders, flux, adhesives, or the like need be used. This, then, eliminates additional processing steps, such as mixing and properly adjusting the respective mixing ratios. The cutting properties of the resulting tools, or, rather, the cutting edges of surfaces thereof are excellent.

In accordance with the preferred feature of the invention, a power laser beam is used in order to obtain partial melting of the surface region. Preferably, application of the abrasive, or cutting particles or granules, as well as the melting, is carried out in a protective atmosphere. An evacuated chamber is not needed. In the simplist form, the surface to be coated is upwardly directed, the laser is downwardly directed thereon, and the granular particles of the cutting material are permitted to dribble or run or trickle down on the melted surface. That portion of the granular material which does not adhere or does not embed itself in the surface is collected in a vessel positioned below the article to be coated, and then reused.

The process is particularly suitable to improve the cutting characteristics of the edges of saw blades: it can be used for other applications as well, for example to improve the cutting properties of drills.

DETAILED DESCRIPTION

A saw blade, for example the blade of a saber saw is positioned in a suitable holder, with the cutting edge facing upwardly. A carbon dioxide laser of 500 W power is used, directing its beam to the edge of the saw blade to partially melt the saw blade. For melting of the entire saw blade, relative movement, back and forth, between the saw blade and the laser can be used, for example by providing a laser which oscillates back and forth so that the beam defines a plane which is coincident with the edge of the cutting surface of the saw blade.

After partially melting the edge surface, or melting the edge surface in zones, a supply trough or the like releases granules of tungsten carbide, having a grain size of, for example, between about 0.3 and 1.5 mm diameter, depending on the thickness of the cutting edge, and the eventual use to which the blade is to be put. A trough, or other vessel is located beneath the saw blade to catch any material which is not retained by the partially melted edge of the saw blade, so that such granules of tungsten carbide can be reused.

The saw blade can also be guided in a V-shaped trough, or collector having a slit at the pointed end. The saw blade projects through the slit into the V-shaped trough, and is melted in the portion which projects over the V-shaped region. The V-shaped trough is filled with tungsten carbide granules of, for example, between 0.3 and 1.5 mm diameter. The partially melted surface of the saw blade, or other article will solidify rapidly due to the unheated remainder of the saw blade and form a fine, granular lattice in which the carbide granules will embed themselves in random orientation. The randon orientation, and the differing grain sizes of the carbides, in particular, provide a particularly wear-resistent saw blade edge, which has excellent cutting properties. The maximum size of the tungsten carbide particles need not be limited to that in the example given; and smaller sizes than 0.3 mm diameter may be used. In a preferred form of the invention, however, carbide particles within various dimensional ranges, for example between about 0.3 and 1.5 mm diameter are mixed together to provide a cutting edge of cutting surface which is thoroughly coated with tunston carbide of slightly different projection from the cutting edge.

In accordance with another method, the saw blade is clamped in a holder with the cutting edge facing downwardly. After partial melting of the cutting edge, the saw blade is drawn through a trough, which preferably is V-shaped, and retains the particles of tungsten carbide. Sufficient tungsten carbide particles will adhere to the cutting edge so that, again, a saw edge with excellent cutting properties will result.

The processes described can be carried out in air, preferably, however, under a shroud of a protective gas, for example nitrogen; or they can be carried out in a chamber, containing nitrogen as a protective gas.

Similarily, cutting edges of drills can be improved by introducing tungsten carbide granules therein, by guiding a laser beam over the cutting edges of the drill, thereby partially melting the cutting edges and applying the tungsten carbide particles when the cutting edges are in melted conditions. Preferably, with drills, the tungsten carbide is applied by permitting the particles to run over the partially melted surfaces, or feeding or trickling down the particles over the surfaces.

The invention is not limited to the use of tungsten carbide, although tungsten carbide is the most widely used wear-resistant hard material. Other metallic carbides or metallic nitrides, silicides, or borides, or mixtures thereof may be used.

In some applications it may be desirable to provide the surface, before melting, with a wavy, or knurled or serrated configuration.

If an electron beam is used for melting, the process will be carried out under vacuum.

Various changes and modifications may be made, and features described in connection with any one of the embodiments may be used with any others, within the scope of the inventive concept.

We claim:

1. Method comprising, in accordance with the invention, the steps of
    partially melting the surface region of the cutting edge of the tool by moving a beam of radiant energy relative to successive portions of the surface thereof;
    contacting the partially molten edge with abrasive cutting particles of at least 0.3 mm in diameter in granular form and partially embedding said particles in the molten edge;
    and permitting said cutting edges, with sharp corner portions of said granular particles projecting by slightly differing distances therefrom, to solidify and harden.

2. Method according to claimm 1, wherein the step of applying a beam of radiant energy comprises
    applying a laser beam in a pattern of oscillation which defines a plane coincident with the edge of the cutting surface of said tool.

3. Method according to claim 2 wherein the beam is applied under a protective atmosphere.

4. Method according to claim 3 wherein the protective atmosphere comprises a nitrogen atmosphere.

5. Method according to claim 3 wherein said step of applying the laser beam and the particles is carried out in a closed chamber including a protective gas.

6. Method according to claim 5 wherein the protective gas is nitrogen.

7. Method according to claim 1 wherein the step of applying a beam of radiant energy comprises applying an electron beam.

8. Method according to claim 7 wherein said step of applying the electron beam and the cutting particles to the partially melted edge are carried out under vacuum.

9. Method according to claim 1 wherein the step of applying the cutting particles comprises placing the cutting edge to face upwardly:
    and permitting said hard cutting particles to run over the partially melting cutting edge portion, by gravity.

10. Method according to claim 9 including the step of collecting excess particles for reuse, by placing a collection vessel beyeath the cutting tool as its edge is being melted, and the granules are being permitted to run thereover.

11. Method according to claim 1 wherein the step of applying the cutting particles comprises collecting the cutting particles in a container;
    and dipping the cutting tool, with the cutting edge partially melted, into the container.

12. Method according to claim 1 including the step of serating or knurling the surface of the cutting edge prior to carrying out the partial melting step.

13. Method according to claim 1 wherein the step of applying the cutting particles comprises applying particles of tungsten carbide.

14. Method according to claim 13 wherein the tungsten carbide particles have a granular size between about 0.3 mm and 1.5 mm.

15. Method of partially embedding hard cutting particles on the surface of the cutting edge of cutting tool, particularly saw blades, comprising the steps of generating, in a carbon dioxide, power laser a beam of laser radiant energy;
    directing said beam of laser energy to the cutting edge in which the cutting particles are to be embedded;
    partially melting the cutting edge by said beam;
    applying said particles to the partially melted cutting edge, in non-uniform granular form having randomly distributed, between about 0.3 and 1.5 mm diameter;
    and permitting said cutting edge, with the granular particles thereon, embedded at the partially melted portion to solidify and harden, whereby the granular cutting particles will be embedded and securely held in the solidified, re-melted portion of the cutting tool;
    and relatively moving the beam and the cutting tool to partially melt a different portion thereof, and then repeating the steps of embedding and permitting to solidify the cutting particles.

16. Method according to claim 15 wherein said step of relatively redirecting the position of the beam and the cutting tool is carried out in a continuous motion.

17. Method according to claim 16 wherein the laser is pivotably mounted to swing about a pivot point, the beam being directed downwardly against an upwardly directed cutting edge, and scanning over the cutting edge.

18. Method according to claim 17 wherein the step of melting the cutting tool, and embedding the particles is carried out in a protective gas atmosphere.

19. A cutting tool wherein said cutting edge is characterized by a solidified melt zone having partially embedded in said melt zone particles of hard cutting material of at least 0.3 mm diameter with sharp corners thereof projecting by slightly differing distances therefrom.

20. Cutting tool according to claim 19 wherein said tool body comprises a saw blade;
    and said hard cutting particles comprises at least one of the materials of the group consisting of
    tungsten carbide;
    a metallic nitride;
    a metallic silicide;
    a metallic boride.

* * * * *

UNITED STATES PATENT AND TRADEMARK OFFICE
CERTIFICATE OF CORRECTION

PATENT NO. : 4,488,882
DATED : December 18, 1984
INVENTOR(S) : Friedrich DAUSINGER et al It is certified that error appears in the above-identified patent and that said Letters Patent is hereby corrected as shown below:

Claim 1, lines 1 and 2, (column 3, lines 19 and 20) change to read: "Method of embedding hard cutting particles on the surface of a cutting edge of cutting tools, particularly saw blades, drills comprising, in accordance with the invention, the steps of Claim 19, line 1 (column 4, line 49) change to read: "A cutting tool having a cutting tool body terminating in a cutting edge, wherein said cutting edge is char- On the title page the assignee should read
-- Robert Bosch GmbH, Stuttgart, Fed. Rep. Germany --.

Signed and Sealed this

Twenty-ninth Day of October 1985

[SEAL]

Attest:

DONALD J. QUIGG

Attesting Officer

Commissioner of Patents and Trademarks—Designate